Dec. 23, 1930.  F. P. GRUENHOLZ ET AL  1,786,062
FLOWER BASKET
Filed July 15, 1929
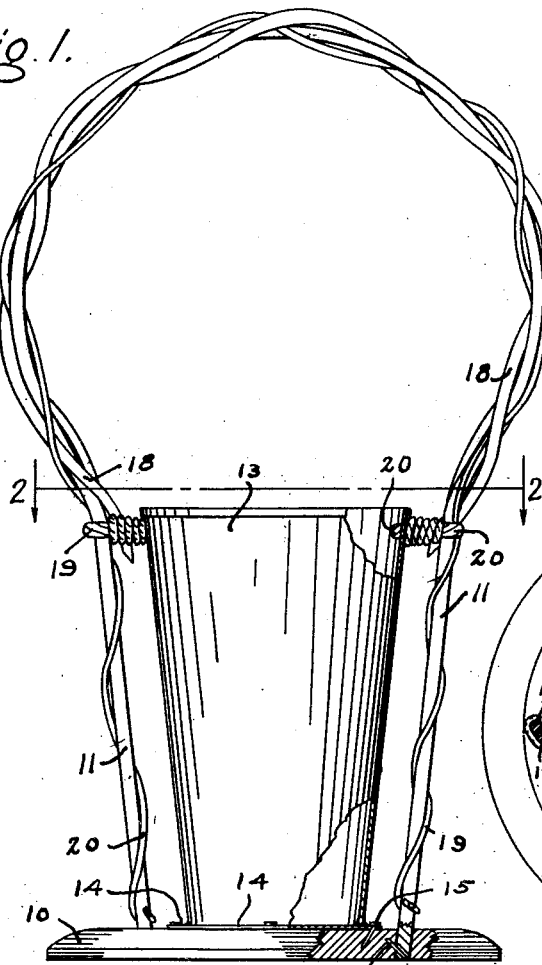
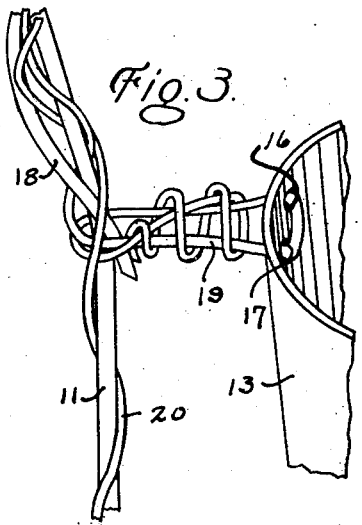
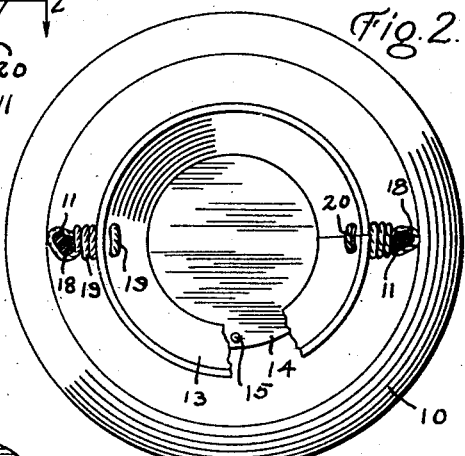
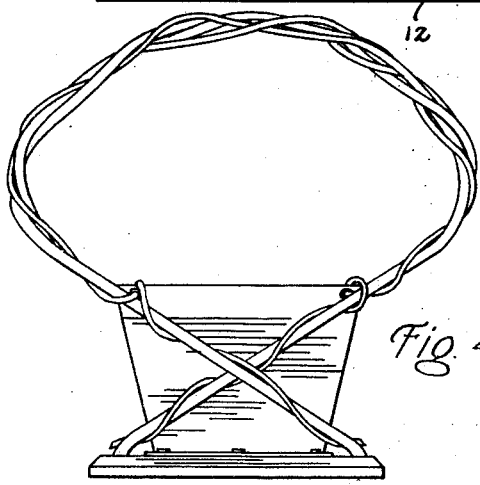
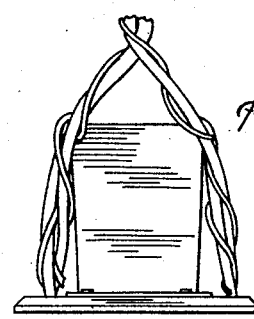
Inventors,
Fred P. Gruenholz, and
Andrew A. Gruenholz,
By Minturn & Minturn,
Attorneys.

Patented Dec. 23, 1930

1,786,062

UNITED STATES PATENT OFFICE

FRED P. GRUENHOLZ AND ANDREW A. GRUENHOLZ, OF TERRE HAUTE, INDIANA

FLOWER BASKET

Application filed July 15, 1929. Serial No. 378,251.

This invention relates to the art of flower baskets and particularly to that type of basket which is adapted to hold cut flowers and preserve them in a fresh condition over a period of time.

Heretofore it has been customary to make baskets of the wicker type and then insert a can or similar vessel fitting closely therein and formed and constructed to hold water.

It is the purpose of our invention to form a basket eliminating the heretofore two piece construction and embodying the water container directly as an integral part of the basket.

Further objects reside in the method of forming, attaching, and supporting a handle in combination with the water container and also in the provision of a structure that may be quickly and readily manufactured at a relatively low cost of production and at the same time provide a sightly construction.

These and other objects will become apparent in the following description of the invention as illustrated by the accompanying drawing, in which—

Fig. 1 is a front elevation of a basket embodying our invention with parts broken away to disclose the structure;

Fig. 2, a horizontal section on the line 2—2 in Fig. 1;

Fig. 3, a detail perspective in more or less diagrammatic form of the connection between the handle and the water container;

Fig. 4, a front elevation of a basket modified in form from that shown in Fig. 1; and Fig. 5, an end elevation of the form shown in Fig. 4.

Like characters of reference indicate like parts throughout the several views in the drawing.

We form a base 10 to have holes bored therethrough to receive the ends of the reed 11 which is looped upwardly from the base to form the basis of a handle.

The ends of the reed 11 are secured in the base by means of brads 12 driven through the reed from the bottom and into the base 10.

Referring to Fig. 1, a metallic container 13, here shown as frustro-conical in shape, is formed to have a flange 14 projecting annularly from the plane of the base of the container. The container is secured to the base 10 by driving brads 15 through this annular flange 14 and into the base 10.

Now referring to Figs. 1, 2 and 3, on opposite sides of the container 13 toward the reed 11 are punched a pair of holes 16 and 17. A length of reed 18 is twisted about the upper looped portion of the reed 11 to have its ends terminating slightly below the horizontal plane including the holes 16 and 17. A third length of reed or fiber 19 is then inserted by one end through the hole 17, Fig. 3, from the outside of the container, carried across inside of the container and back out the hole 16 across and around the reed 11 and the end of the reed 18 and is then wrapped around the two lengths of the reed 19 between the container and the reed 11 to have its end tucked through therebetween adjacent the reed 11.

The longer end of the reed is then wrapped and twisted around the reeds 11 and 18 throughout the upper looped portions and is carried around and downwardly on the opposite side of the reed 11 substantially to the base 10, Fig. 1, where the end is tacked to the reed 11.

Similarly a reed 20 has one end passed through the holes 16 and 17 on the opposite side of the container and tied to the reed 11, to have its longer end tied and wrapped around the combined reeds 11, 18 and 19 to terminate on the lower end of the reed 11 on the opposite side from the terminal end of the reed 19.

It is thus to be seen that the container 13 is first securely attached to the base 10 and that the handle is built up on the reed 11 out of a plurality of strands and is securely tied to the upper end of the container 13 to secure a complete unitary, well braced structure.

While the container 13 is here shown as having a frustro-conical shape, the container may assume other shapes such as that shown in Figs. 4 and 5 where the handle 21 is formed in a slightly different fashion but involving the same principle in structure as above described in that the handle, Figs. 4 and 5, have lower ends of reeds secured to the base with other reeds tying the handle to the upper end of the container.

While we have here shown and described our invention in the form as now best known to us, it is obvious that many structural changes may be made from that form without departing from the spirit of the invention, and we therefore do not desire to be limited to that precise form any more than may be required by the following claims.

We claim:

1. In a flower basket, a water receptacle, having a hole therethrough near its top edge on opposite sides, a handle having ends extending downwardly on each side of the receptacle adjacent said holes, a tie piece having one end inserted through one of said holes and wrapped back around said handle thereadjacent and the other end carried around said handle past the hole on the opposite side of said receptacle, and a second tie piece having one end entered through the other of said holes and carried back to wrap around said handle thereadjacent and having its other end carried around the handle past said other hole.

2. In a flower basket, a water receptacle, having a hole therethrough near its top edge on opposite sides, a handle having ends extending downwardly on each side of the receptacle adjacent said holes, a tie piece having one end inserted through one of said holes and wrapped back around said handle thereadjacent and the other end carried around said handle past the hole on the opposite side of said receptacle, and a second tie piece having one end entered through the other of said holes and carried back to wrap around said handle thereadjacent and having its other end carried around the handle past said other hole, a flange projecting from the base of said receptacle, a mounting base, and nails passed through said flange into said base.

3. In a flower basket, a water receptacle having a hole therethrough near its top edge on opposite sides, a handle having ends extending downwardly on each side of the receptacle adjacent said holes, a tie piece having one end inserted through one of said holes and wrapped back around said handle thereadjacent and the other end carried around said handle past the hole on the opposite side of said receptacle, and a second tie piece having one end entered through the other of said holes and carried back to wrap around said handle thereadjacent and having its other end carried around the handle past said other hole, a flange projecting from the base of said receptacle, a mounting base, and nails passed through said flange into said base, said handle ends being secured to said base.

4. In a flower basket, a base, a water receptacle resting on the base, a flange extending from the lower end of the receptacle and secured to the base, a handle secured to said receptacle near its upper end and tie pieces wrapped about the handle and laced through holes in the receptacle.

5. In a flower basket, a base, a water receptacle resting on the base, a flange extending from the lower end of the receptacle and secured to the base, a handle secured to said receptacle near its upper end by tie pieces laced through holes in the receptacle, said handle having ends extending downwardly along the receptacle and secured to said base.

6. In a flower basket, a base, a water receptacle resting on the base, a flange extending from the lower end of the receptacle and secured to the base, a handle secured to said receptacle near its upper end, said handle having ends extending downwardly along the receptacle and secured to said base, said handle being secured to said receptacle by tie pieces laced through holes in the receptacle and wrapped about said handle.

In testimony whereof we affix our signatures.

FRED P. GRUENHOLZ.
ANDREW A. GRUENHOLZ.